Oct. 28, 1969　　　W. G. O'NEILL, JR　　　3,474,820
Y-PATTERN CORROSION-RESISTANT VALVE
Filed Dec. 9, 1968　　　2 Sheets-Sheet 1

INVENTOR
WILLIAM G. O'NEILL, JR.
BY
ATTORNEYS

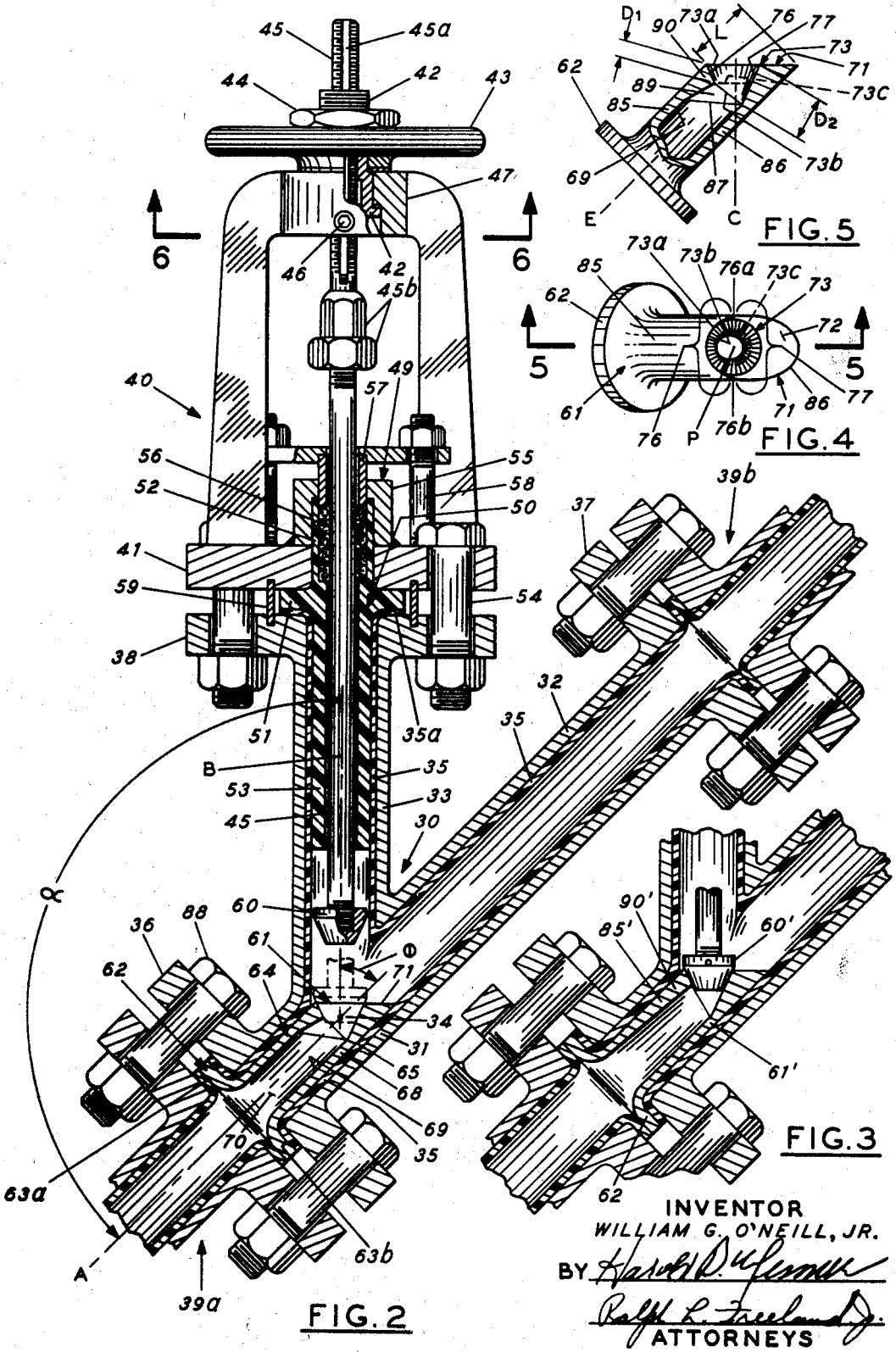

United States Patent Office 3,474,820
Patented Oct. 28, 1969

3,474,820
Y-PATTERN CORROSION-RESISTANT VALVE
William G. O'Neill, Jr., Pleasant Hill, Calif., assignor to Chevron Research Company, San Francisco, Calif., a corporation of Delaware
Continuation-in-part of application Ser. No. 698,355, Jan. 16, 1968. This application Dec. 9, 1968, Ser. No. 782,405
Int. Cl. F16k *1/10, 1/38*
U.S. Cl. 137—375                5 Claims

ABSTRACT OF THE DISCLOSURE

A Y-pattern corrosion-resistant valve having an easily renewable valve stem, valve seat means and valve plug and including (1) a Y-pattern flanged valve chamber having (i) three flanged arms in which the two straight arms (parallel registry) are adapted to pass corrosive fluids through the Y-chamber and (ii) an interior, resilient plastic innerlining terminating in radial directions over the faces of the flanges of the three arms, (2) an exterior clamping and support assembly outwardly directed from said valve chamber and including a flange portion and a central opening operatively aligned with the third, lateral arm of said Y-valve chamber, and (3) a stuffing box means attached at the third, lateral arm of the Y-valve chamber and including a stuffing box liner or corrosion-resistant material at least partially housed in the third arm and extending through the central opening of the clamping assembly, and having (i) a central aperture through which the valve stem (and valve plug) extends, (ii) a stepped outer surface larger, in size, than the third arm thereby defining a radial protrusion extending over a portion of the flange face of said third arm in contact with the radial extension of the interior plastic liner of said valve chamber, and (iii) an interior recess adjacent to the valve stem for receiving resilient packing means adapted to provide sealing contact with the valve stem, and (4) a valve seat means secured to the Y-chamber at the first arm, having a side wall of sufficient length to terminate, along an oblique plane, in the region of the central junction of the arms.

In the vicinity of the oblique plane, the side wall of the valve seat means also includes an interior surface formed to provide an obliquely oriented valve seating surface turned toward the entrance to the third, lateral arm of the Y-chamber so as to enable the valve seat means to receive the valve plug attached to the valve stem during operations. In that way control of flow of hostile fluids through the Y-chamber, without leakage, is achieved.

RELATED APPLICATIONS

This invention is a continuation-in-part of Ser. No. 698,355 entitled "Corrosion-Resistant Valve" filed Jan. 16, 1968, now Patent No. 3,420,262, which, in turn, is a continuation of Ser. No. 538,844, filed Mar. 30 1966, now abandoned.

This invention relates to Y-pattern valves rendered substantially noncorrosive by the use of materials capable of resisting chemical attack for the purpose of meeting requirements in the handling of highly corrosive acids, or other chemicals, tending to corrode metallic materials.

This invention has particular utility in the production of meta-xylene by the selective sulfonation of the meta-xylene present in the isomeric mixtures of xylen hydrocarbons. In the production of meta-xylene, a metal-xylene sulfonic acid sludg is produced and subsequently is placed in a pressurized reaction vessel with water at elevated temperature, say in a range of 360–390° F. Within the reaction vessel, the sulfo radical of the sludge ($-HSO_3$) is converted to sulfuric acid. The present invention is useful in providing Y-pattern valves for the handling of the subsequently produced sulfuric acid.

In accordance with the present invention, a Y-pattern metal valve chamber, preferably in the form of a standard flanged 45° lateral fitting, is provided in which the inner surface is lined with a plastic lining, such as Teflon—a registered trademark of E. I. du Pont de Nemours and Company. Within the Y-chamber, a valve plug and a valve seat means formed of highly resistant metals, such as tantalum, are provided to releasably control fluid passage through the chamber. More particularly, the valve plug is movably located in the lateral or third arm of the Y-chamber while the unitary valve seat means is secured to the Y-chamber within a first straight arm of the chamber, the first arm being separated from the lateral arm by an exterior angle greater than 90° measured between the axes of symmetry of these arms. The second arm of the Y-pattern chamber is in parallel registry with the first straight arm and includes a terminal flange that is connected to an associated piping network by which corrosive fluids can be controllably passed through the Y-pattern valve chamber by way of the first and second arms.

At the terminal flange of the third arm of the Y-chamber is attached a rising stem yoke assembly, the yoke assembly attaching to a handwheel and a valve stem through a swivel bushing means. The stem may undergo relative oblique axial movement along the axis of symmetry of the third arm relative to the central junction of the Y-chamber through the operation of the handwheel and swivel bushing means without relative angular rotation between these parts.

In accordance with another aspect of the present invention, the unitary valve seat means is secured relative to the Y-chamber at the first arm. The valve seat means is of general cylindrical shape and has a side wall of sufficient longitudinal length to terminate in the region of the central junction of the arms of the Y-valve chamber. The side wall does not terminate along a plane normal to its longitudinal axis of symmetry, however, but instead is terminated along an oblique plane. In that way, the interior surface of the side wall, at the interior end, adjacent the central junction of the Y-valve chamber, can be adapted to form an obliquely oriented valve seating surface turned toward the entrance of the third arm. The valve plug attached to the valve steam and yoke assembly thus is easily movable into sealing contact with the valve seating surface during operations. The obliquely oriented valve seating surface preferably comprises unequal first and second circumferentially extending, arcuate surface areas symmetrically disposed about the axis of symmetry of said third arm in positional association with coextensively positioned first and second arcuate wall segments, respectively, of the side wall. These first and second wall segments extend over the entire length of the valve seat means. In the vicinity of the obliquely oriented valve seating surface they preferably have thicknesses which asymmetrically vary; the first arcuate wall segment decreases in thickness in a direction towards the interior, terminating end of the valve seat means while, simultaneously, the second arcuate wall segment increases in wall thickness in the aforesaid direction. In accordance with still another aspect of the present invention, the rising stem of the present valve is sealably connected to the Y-chamber at the third, lateral arm by means of a stuffing box fitted with a novel stuffing box liner that extends within the Y-chamber. The cylindrical liner is unitarily formed of corrosion-resistant material, such as Teflon, and includes a stepped outer surface over a mid-portion forming a protrusion, or flange, which releasably and sealably connects between the lined flanged end of the Y-chamber and flanged base of the yoke assembly. Above the enlarged flange exterior of the Y-chamber, the liner is recessed along its interior surface to accommodate the packing of the stuffing box which sealably contacts to the stem and prevents leakage of the fluid from the Y-chamber. Below the flange within the Y-chamber, the remainder of the interior surfaces is placed in slidable contact with the stem to guide the plug into contact with the valve seat means. The outer surface of the liner is also placed in surface contact with the lateral arm of the Y-chamber to aid in preventing leakage of the fluids from the chamber. Safe operation of the valve is further enhanced by placing a metal circular blowout ring at the end of the enlarged flange of the stuffing box liner, as by location of the ring in circular slots in the faces of the flanges of the lateral arm of the valve chamber and the yoke assembly.

It is an object of the present invention to provide a fluid-tight corrosion-resistant Y-pattern valve for use in controlling passage of erosive and corrosive fluids from a Y-pattern valve chamber by way of first and second arms in parallel registry, in which the seat valve means, plug and stuffing box may be renewed without complete disassembly of the valve; the valve is composed of materials capable of withstanding hostile chemical reactions interior of the valve, as well as exterior thereof, as at the flanges of the associated piping to which the valve attaches, and in which the stem is sealed relative to a stuffing box at the third, lateral arm of the Y-pattern valve chamber by means of multiple functioning stuffing box liner of unitary construction, but the stem being capable of movement relative to the liner to place a valve plug (attached to the stem) in contact with an obliquely oriented seating surface at the interior surface of the valve seat means secured to the first arm of the Y-chamber.

Experience has shown that corrosion rates (metallic loss per unit time) for valves used in the handling of corrosive fluids, such as sulfuric acid produced by the selective sulfonation of isomeric mixtures of xylene hydrocarbons, can be quite high. For example, a gate valve formed of a high nickel base alloy, say Hastaloy B, a registered trademark of the Union Carbide Corporation, has been found to have a corrosion rate of about 3 inches/year in a line connected to the pressurized reaction vessel where sulfuric acid is formed. Reasons for the high corrosion rate include, inter alia: the nature of the acid attacking the valve, its concentration, temperature, and pressure, and velocity of impingement, and the valve material.

Generally speaking, the interplay of the above-listed factors in any environment is believed to create conditions which can cause the corrosion rates to become excessively high. (By the term "excessively high," it is meant that the corrosion rate is so high that replacement of the affected equipment occurs too rapidly, from either a cost or process down-time standpoint.) Usually a loss of about .03 inch between mating and sealing surfaces of a conventional valve requires its immediate replacement. In this regard, this invention is especially useful in hostile environments where conventionally used valves have high replacement rates, e.g., where corrosion rates of at least .10 inch per year at the mating surfaces of the valve seat and valve plug. However, the present invention also can be used in environments having corrosion rates of .25 inch per year or higher and elevated pressures and/or temperatures. An upper temperature limit of the valve of the present invention is about 500° F., however.

Other objects and features of the invention will become more apparent after consideration of the following description of two embodiments of the invention taken in conjunction with the following drawings, wherein:

FIGURE 2 is an elevational view, partially cut away, of the valve of the present invention;

FIGURE 3 is a detail of the central region of a modified form of the Y-pattern valve of the present invention;

FIGURE 4 is a detail of the valve seat means of the Y-pattern valve of FIGURE 2, in which the oblique terminal face of the side wall of the valve seat means is depicted in full plan view, while the hub and shank portion are shown in perspective;

FIGURE 5 is a sectional view taken along line 5—5 of FIGURE 4;

Figure 1:
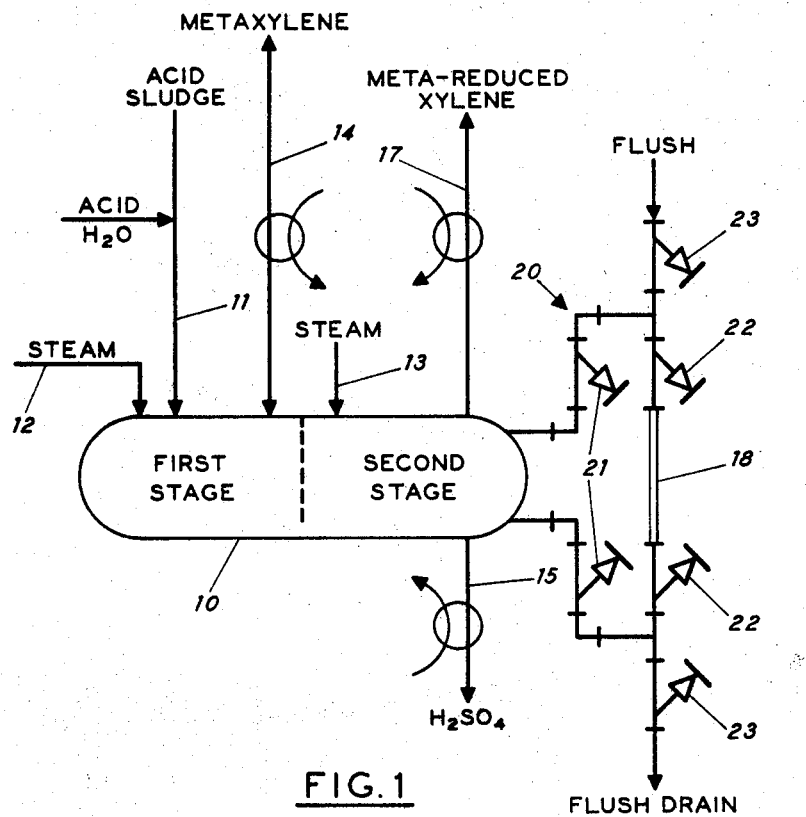
FIGURE 1 is a schematic flow diagram of a process wherein the Y-pattern valve of the present invention may be employed.

FIGURE 1 illustrates, in flow diagram form, a process including vessel 10, wherein a series of noncorrosive Y-pattern relief valves embodying the invention may be employed. In the vessel 10, a process, such as the hydrolysis of a meta-xylene sulfonic acid-sulfuric acid sludge, may be in progress. The acid sludge may be formed in previous process steps, as by the selected sulfonation of a hydrocarbon feed composed of meta-xylene and at least one other xylene isomer to a meta-xylene rich product—for example, as shown in Patent No. 2,943,121 ("Separation of Meta-Xylene From Isomeric Xylene Mixtures," J. A. Spence, issued June 28, 1960, and assigned to the assignee of the present application). In the illustrated process, the acid sludge and water enter the vessel through feed line 11. To remove the sulfo radical ($-HSO_3$) from the meta-xylene sulfonic acid sludge, water is combined with the radical to form sulfuric acid. To provide the addition of heat for the reaction, steam enters the first stage of the vessel through steam line 12 and the second stage of the vessel through steam line 13. The temperature of the first stage of the vessel is adjusted to separate the sludge into a hydrocarbon fraction rich in meta-xylene which is removed from the first stage of the vessel by outlet line 14 and a sulfuric acid layer fraction removed by bottoms line 15 in the second stage of the vessel. Steam enters through the steam inlet line 13 in the second stage to hydrolyze the balance of the meta-xylene sulfonic acid-sulfuric acid sludge to provide an additional sulfuric acid layer fraction and a hydrocarbon fraction lean in meta-xylene. The hydrocarbon fraction lean in meta-xylene is removed through outlet line 17.

Purity of the removed hydrocarbon rich in meta-xylene, and the strength of the sulfuric acid layer fraction (preferably 55%), are dependent upon the degree of completion of the reaction of the sludge and the water; and a measure of reaction completion is the height of the interface level of the reaction fractions formed in the second stage of the vessel. To determine the height above a norm, a glass gauge 18 is periodically connected to the vessel 10 through a Y-pattern and piping system, generally indicated at 20. In periodically checking the interface level, Y-pattern block valves 21 and Y-pattern gauge valves 22 are opened to admit the second stage reactant fractions, including the sulfuric acid fraction. As the block and gauge valves are opened, Y-pattern flushing valves 23 remain closed. After the interface level has been determined, the block valves are closed and the second stage reactant fractions removed from the gauge 18. Thereafter, the gauge is flushed by opening the flushing valves 23 to a source of flushing fluid (not shown). In operation, the Y-pattern valves 21, 22 and 23 are subject to chemical attack by the formed sulfuric acid. This invention relates to a Y-pattern valve construction capable of withstanding such an attack.

Referring now to the drawings, the preferred embodiment of the invention is illustrated in FIGURE 2. Central Y-pattern valve chamber 30 is formed of a standard flanged 45° lateral pipe fitting having first and second straight arms 31 and 32 (in parallel registry) and a lateral oblique arm 33 facing outwardly from central junction 34. Y-chamber 30 is lined with a non-corrosive plastic linear 35 such as Teflon—a registered trademark of E. I. du Pont de Nemours and Co. The liner 35 terminates on flanges 36, 37 and 38 of the Y-chamber 30, as shown. To the flanges 36 and 37 of the arms 31 and 32 are mounted piping networks 39a and 39b, respectively, for mechanically connecting the central Y-chamber 30 to a source of fluid (not shown).

Fluid flow through Y-chamber 30 is confined—in the transverse—by first and second arms 31 and 32. The arms 31 and 32 are in parallel registry, as shown, symmetrical about axis A. However, third lateral arm 33 serves more as a support housing than as a fluid conveyor and is seen to be separated from the first arm 31 by an exterior angle α, the magnitude of which is greater than 90° as measured between the axis of symmetry A of the first and second arms and axis of symmetry B of the third lateral arm 33 (angle α thus can be termed "obtuse").

Yoke assembly 40 is mounted by base support 41 to flange 38 of the lateral arm 33. At the upper end of the assembly 40 is located a swivel bushing 42 for converting rotation of handwheel 43 to linear movement of valve stem 45 into and from the Y-valve chamber 30. Bushing 42 is threadably engaged at its exterior surface to the handwheel 43, as by nut 44 and is threadably attached on its interior threaded surface to the upper extension of stem 45. The upper extension of the stem, which can be of ordinary steel, is provided with a slot 45a and attaches to the lower extension of the stem as by lock nuts 45b. The lower extension of the stem is preferably of a corrosion-resistant metal such as tantalum.

Figure 6:
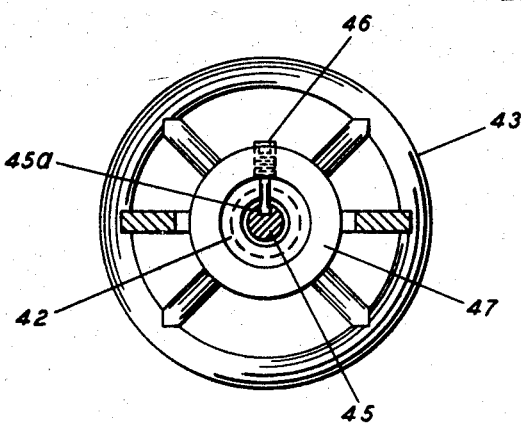
FIGURE 6 is a sectional view taken along line 6—6 of FIGURE 2 illustrating the yoke assembly of the Y-valve of the present invention in more detail.

Valve stem 45 is provided, as previously mentioned, with linear movement for travel along the axis of symmetry B of the lateral arm 33 as handwheel 43 is rotated, but such movement is not accompanied by rotary movement of the stem. The stem is prevented from following the angular rotation of the handwheel by means of a slot-bar coupler comprising set screw 46 and the slot 45a in the stem 45. As shown in detail in FIGURE 6, set screw 46 of the coupler is threadably attached to hub 47 of the yoke assembly 40, the tip of screw 46 extending within the slot 45a formed along the upper extension of the stem 45 to prevent rotation of the stem. Linear movement of the bushing 42, i.e., movement in the axial direction along the lateral arm 33, as viewed in FIGURE 2 is prevented, in the upward direction, by suitable shoulders on the upper portion of the yoke assembly and, in the downward direction, by set screw 46.

As stem 45 moves into or from the Y-chamber 30, as viewed in FIGURE 2, leakage of hostile fluids from the chamber 30 is prevented by stuffing box 49. Stuffing box 49 includes cylindrical stuffing box linear 50 concentrically located about the stem 45. Stuffing box liner 50 is unitarily formed of corrosion-resistant material, such as Teflon, and includes an exterior protrusion or flange 51 over a mid-portion which separates the liner into an upper section 52 and a lower section 53, as viewed in FIGURE 2. The flange 51 is adapted to sealably attach between the following: base support 41 of the yoke assembly 40 and the flange 38 of the arm 33. The radial width of the flange 51 of the liner should be at least as wide as that of terminal flange 35a of the plastic lining 35 circumferentially extending about the exterior surface of flange 38 of lateral arm 33. In this way, a suitable seal is provided between these parts, and the flange 38 of the Y-chamber is protected against the corrosive effects from the fluids within the Y-chamber 30. Fastening pressure is applied to flange 51 of the liner 50 by a series of fastening bolts 54 extending through both: base support 41 of the yoke assembly and flange 38 of the lateral arm 33.

Lower section 53 of stuffing box liner 50 preferably has a side wall of uniform thickness. The outer surface is in tight surface contact with the plastic lining 35 of lateral arm 33 to aid in preventing leakage from the Y-chamber 30; the inner surface is in slidable contact with the lower extension of the valve stem 45 to suitably guide the stem in movement through the chamber.

Upper section 52 of the stuffing box liner 50 extends through base support 41 of the yoke assembly and terminates within stuffing box housing 55 of the stuffing box 49. The inner surface of upper section 52 is stepped, however, to form a recess to suitably receive a series of packers 56 which may also be formed of a noncorrosive material, such as Teflon. The packers 56 are placed in sealable contact with the stem 45 by gland 57. As fastening bolts 58 are tightened, the gland 57 travels downward into pressure contact with the packers causing inward sealing displacement of the packers toward the portion of the stem then within the upper section 52.

Not only does the resilient contact between flanges 35a and 51 (related to plastic lining 35 and to the stuffing box liner 50, respectively) insure an adequate seal between the yoke assembly and the Y-valve chamber, but these flanges also help in sealing blowout preventer 59. Blowout preventer 59 is formed of metal and is positioned within aligned slots in the support base 41 of the yoke assembly and flange 38 of the lateral arm 33. A seal is provided at the top and bottom of the slots. However, variation in depth of the slots above a norm is not overly critical. The resilient nature of the flanges 35a and 51 accommodates excess slot length and still provides a seal between the yoke assembly and the Y-valve chamber.

Valve plug 60 screwably attaches to the lower extension of the lower extension of the valve stem 45. Although the plug is formed of corrosion-resistant material, such as tantalum, the material used to form the lower portion of the stem can be of a more conventional nature inasmuch as only the plug undergoes wearing contact within the corrosive environment of the Y-valve chamber. The valve plug is beveled along its outer surface in a conventional manner to provide tapered surface for sealing contact with valve seat means 61 located within first straight arm 31 of the Y-valve chamber. The valve plug is depicted, in phantom, in FIGURE 2, in contact with valve seat means 61.

As shown, the valve seat means 61, sectioned along a plane intersecting axes of symmetry A and B of the three arms of the Y-chamber, is preferably of a unitary cylindrical shape. The valve seat means 61 includes an enlarged hub 62 fashioned into a flange placed exterior of the Y-chamber in sealable attachment between flange 36 of the first straight arm 31 and the adjacent flange 61 of the piping network 39a, and a more centrally disposed shank 64. As shown, shank 64 extends within the interior of the first arm 31 in contact with the plastic lining 35. Valve means 61 is formed of a corrosion-resistant material such as tantalum.

Hub 62 has annular flange faces 63b and 63a constructed to contact plastic liner 35 attached to straight arm 31 and the lining terminating at the flange of piping network 39a, respectively. In that way suitable sealing surfaces can be provided between these parts to insulate piping network 39a from corrosive effects of hostile fluids within the Y-valve chamber.

At the interior of the valve seat means 61, a shank 64 has an outside diameter, at exterior surface 65, that is about equal to (or slightly greater than) the inside diameter of the first arm 31. Thus the probability of leakage of the hostile fluids from the Y-valve chamber along the exterior surface 65 is significantly reduced.

Side wall 68 extends the entire length of the hub 62 and shank 64. The side wall 68 has an interior surface 69 which defines apertures 70 extending the entire length of the valve seat means 61.

Interior terminal face 71 of the valve seat means 61 is not perpendicular to the axis of symmetry A of the first and second arms 31 and 32. Instead, as shown, its plane of termination intersects side wall 68 at an oblique angle. Measured between axis of symmetry A of the first and second arms and the axis of symmetry B of the third lateral arm, the plane of termination is defined by the angle $\phi$. Further, where a 45° lateral valve fitting is used to form the Y-valve chamber, terminal face 71 is preferably disposed perpendicular to the axis of symmetry B so that its terminal plane intercepts axis A at 45 degrees.

Aperture 70 also undergoes a change in orientation in the region of terminal face 71. Although aperture 70 is usually of constant diameter over most of its length, it is seen, in the vicinity of terminal face 71, to bend in a direction toward the valve plug 60 which, as previously mentioned, is positioned within the lateral arm 33. This enables the valve plug to be there received during operations to effectively control flow of hostile fluids through the Y-valve chamber.

In more detail, FIGURE 4 illustrates the orientation and constructional features of terminal face 71 and valve seat surface 73. As shown, the terminal face 71 is of a general elliptical shape having a crescent-shaped region 72 formed along one end. At one edge of region 72 is the seating surface 73. Circular edge 73a of the seating surface 73 is of maximum diameter centered at point P in the plane of terminal face 71. The trailing edge 73b of the seating surface 73 is seen to be terminated below the terminal face 71 interior of the valve seat means 61.

Unequal surface areas 76 and 77 each arcuately and circumferentially extend about a central axis perpendicular to terminal face 71 through point P and, together, they constitute unitary seating surface 73. Note that in a plane parallel to face 71 through the trailing edge 73b there is an arcuate intersection line on the surface 77 along dotted line 73c. It is further evident that surface area 76 can be defined, at least in part, by the mean depth radially extending between edges 73a and 73b, and by the mean arcuate length as measured between diametrically opposite edges 76a and 76b along the broad surface thereof marking the boundary with area 77. Likewise, surface area 77 can be defined, in part, by its arcuate length measured between the same edges 76a and 76b. Surface area 77 also has a mean depth interval as measured from edge 73a which varies from a minimum at edges 73a and 73b (and equal to the maximum of the depth of area 76) to a maximum value midway between edges 76a and 76b. In this regard, it should be noted that the minimum depth associated with surface area 76 must be of sufficient magnitude to withstand pressure exerted by hostile fluids within the Y-chamber when the surface area 76 is placed in sealable contact with the valve plug during operations. It is evident that surface areas 76 and 77 are associated with two arcuate side wall segments having boundaries at edges 76a and 76b, each extending the entire length of valve seat means 61: (1) side wall segment 85 extending from hub 62 to surface area 76 and (2) diametrically opposite side wall segment 86 extending from hub 62 to surface area 77. It is further evident that side wall segment 85 reaches a maximum wall thickness in an oblique plane through edge 73b, while the wall thickness of side wall segment 86 is maximum at terminal face 71.

FIGURE 5 illustrates the character of surface areas 76 and 77 and side wall segments 85 and 86 in more detail. The surface areas 76 and 77 are shown in FIGURE 5 symmetrically positioned about central axis C. Axis C is obliquely oriented with respect to longitudinal axis E, about which hub 62 is symetrical. Between edges 73a, 73b and 73c, the valve seat surface 73 forms a truncated conical aperture as previously described. As shown best in FIGURE 5, this aperture decreases in diameter in a linear fashion in a direction away from terminal face 71.

Side wall segments 85 and 86 in the vicinity of areas 76 and 77 are seen to asymmetrically vary in thickness in the following manner: Beginning at a first side wall, circumferential location 87 (obliquely oriented with respect to axis E, as shown), interior surface 69 is provided with an inwardly directed tapered region 89. Tapered region 89 is confined in the longitudinal direction, between location 87 and edge 73b, and has a maximum longitudinal distance which lies in a longitudinal plane which, as shown, intersects surface area 76 at its minimum depth $D_1$ and surface area 77 at its maximum depth $D_2$.

In an oblique plane through edge 73b, a transverse arcuate junction 90 is defined for side wall segment 85 so that, beginning at junction 90 and proceeding toward surface area 76, there is a sequential reduction in the side wall thickness of segment 85. However, in a diametrically opposite arcuate position, side wall segment 86 is seen to have a mean side wall thickness which sequentially increases in a direction toward surface area 77. It should be noted from FIGURE 5 that segment 86 extends beyond segment 85 by an average length L in plane normal to axis E.

It will be appreciated that the tapering of side wall segment 85, as between side wall location 87 and edge 73b, provides for increased rigidity for the side wall at valve seat surface 73, especially in the region of surface area 76. Thus the probability that side wall segment 85 will prevent mechanical rupture of the valve seat means, under the rather large closing pressure provided by the valve plug during operations, is significantly enhanced in the present invention. Minimum depth $D_1$ in the region of surface area 76 is also increased by the aforementioned tapering operation in comparison to a more conventional straight wall valve seating means.

FIGURE 3 illustrates a modified form of the valve seat means 61' of the present invention. As shown, the taper of side wall segment 85' begins at hub 62 instead of at the central location 87 of the valve seat means 61 of FIGURES 2, 4 and 5. The magnitude of the taper is less severe, however. Accordingly, at arcuate junction 90', the thickness of the segment 85' is about equal to that previously described. It is evident that the longer inwardly tapered region for the side wall segment 85' provides the rigidity needed to provide closure between the valve seat means 61' and the valve plug 60' in operations without mechanical rupture of the valve seating means.

Attachment of the valve seat means 61 in FIGURE 2 is between the flange 36 of straight arm 31 and the flange of piping network 39a, as previously mentioned. This is provided by a series of fastening bolts 88 similar to the fastening bolts at the other flanges of the valve chamber. These fastening bolts are easily disengaged to allow quick renewal of the valve seat means 61, the stuffing box liner 50, or the packers 56, as required.

While certain preferred embodiments of the invention have been specifically disclosed, it should be understood that the invention is not limited thereto, as many variations will be readily apparent to those skilled in the art without departing from the spirit of the invention. For example, the valve seat means 61 and 61' can be formed of a softer, more pliable material, such as Teflon, and still provide a metal-to-plastic sealing fit to the valve plug 60 and 60' that resists the corrosive and erosive effects of fluids within the Y-chamber 30. In the use of a plastics seat, an important feature in preventing erosion of the seat between plug is the operation of external swivel bushing 42 which provides linear movement to valve stem 45 to seat plug 60 and 60' within the seat means 61 and 61' but prevents rotation of the stem. Not only is galling between these parts prevented by the operation of the swivel bushing 42, but the number of parts within the environment of the corrosive fluids of the chamber valve is minimized.

I claim:
1. A corrosion-resistant, Y-pattern valve for use in handling corrosive fluid at high temperature and pressure comprising, in combination:
 (a) a hollow, Y-pattern valve chamber having first and second straight arms in parallel registry with one another adapted to join associated sections of pipe to pass said corrosive fluid through said chamber, a third lateral arm extending at an oblique angle with respect to the axes of symmetry of said first and second arms in fluid communication therewith, and a protective lining of resilient plastic material connected to the interior surface of said chamber capable of with standing hostile chemical action due to said corrosive fluid, said third lateral arm being oriented with respect to said first arm of said Y-pattern valve chamber such that the angle of separation therebetween is an obtuse angle, said arms of said chamber being hollow and including side wall means defining passageways therethrough for passing said corrosive fluid, said arms facing outward from a central junction where the axis of symmetry of the arms of said Y-pattern valve chamber intersect, each arm terminating in a flanged end, said lining including terminal flanges connected to respective flanged ends of said first, second and third arms,
 (b) a support base exterior of said flanged end of said third lateral arm, said base having a central opening therethrough aligned with said third arm,
 (c) a yoke assembly attached to said support base,
 (d) a valve stem mounted on said yoke assembly in alignment with the interior of said third lateral arm and including an elongated portion extending into said lateral arm, said yoke assembly including means for reciprocally moving said stem relative to said yoke assembly and said third lateral arm,
 (e) valve plug means firmly secured to and end of said valve stem at a location interior of said Y-pattern valve chamber and reciprocally movable thereto in accordance with movement of said stem,
 (f) unitary valve seat means of corrosion-resistant material releasably secured to said Y-pattern valve chamber at said first arm, and including:
  (i) a side wall of sufficient longitudinal length to terminate in a region of said central junction of said Y-pattern valve chamber and having an interior surface defining an aperture extending the entire length of said valve seat means, and an exterior surface concentric with said inner surface flared, at one end of said side wall, to form a hub portion including an enlarged flange adapted to sealably contact said plastic lining circumferentially disposed at said flanged end of said first arm and, over the remaining length thereof, in a direction toward said other end of said side wall defining a shank portion of uniform outside diameter in sealable surface contact with said plastic lining within said first arm,
  (ii) said exterior surface of said side wall including at said other end of said side wall adjacent to said central junction of said Y-pattern valve chamber, a circumferentially extending valve seating surface beveled with respect to said axes of symmetry of said first and second arms of said Y-valve chamber, said valve seating surface being symmetrical about said axis of symmetry of said third arm and including first and second arcuately extending, unequal, surface areas symmetrically disposed about said axis of symmetry of said third lateral arm, said first and second surface areas being defined by first and second arcuate side wall segments, respectively,
  (iii) said first arcuate side wall segment longitudinally extending along the entire length of said side wall terminating at its interior end at said first arcuate surface area, said first side wall segment being sequentially reduced in cross-sectional thickness as measured along said side wall beginning at a first transverse arcuate junction in the plane of said first side wall segment and terminating at said other end of said side wall,
  (iv) said second side wall segment also extending the entire length of said side wall but terminating at its interior end at said second arcuate surface area, said second side wall segment having cross-sectional thickness which sequentially increases in said direction toward said terminal end of said side wall so as to thereby provide oblique orientation to said continuous valve seating surface,
 (g) gland means attached to said support base including means for moving said gland means with respect to said support base and said chamber,
 (h) stuffing box means including a cylindrical stuffing box liner of resilient plastic material capable of withstanding corrosive action due to contact with said corrosive fluid, said stuffing box liner including a first section housed within said third lateral arm having an outer surface in contact with said protective lining of said chamber, a second section extending from said chamber through said central opening of said support base, having an outer surface in suitable accommodation within said opening, an exterior circumferential protrusion between said first and second sections positioned in contact with a terminal flange of said lining at said flanged end of said third arm, and an interior wall means defining a central opening through which said valve stem extends,
 (i) packing means mounted to said stuffing box means,
 (j) said interior wall means of said stuffing box liner defining said opening being interiorly stepped along said second section to form an interior recess for said packing means, said gland means being movably connected to said packing means to compress said packing means into sealing contact with an adjacently positioned portion of said valve stem to establish a fluid-tight seal therealong and prevent leakage of said corrosive fluid from said chamber along said valve stem, and
 (k) fastening means mounted between said support base and said flanged end of said third arm, said fastening means adapted to apply pressure to said resilient circumferential protrusion of said stuffing box liner and said resilient terminal flange of said lining at said third arm to form a fluid-tight seal therebetween to thereby prevent leakage of said fluid from said chamber at said third arm.

2. The valve of claim 1 including said unitary valve seat means in which said obliquely oriented valve seating surface at said interior surface of said side wall is of sufficient depth, as measured along said first and second surface areas parallel to said axis of symmetry of said third lateral arm to provide control of passage of hostile fluids through said Y-valve chamber, without leakage, when placed in sealable contact with said valve plug, said interior surface of said side wall having an inwardly directed taper toward said axes of symmetry of said first and second arms of said Y-valve chamber over at least a central region of said valve seat means so that the wall thickness of said first arcuate side wall segment reaches a maximum thickness at said first transverse arcuate junction prior to formation of said first arcuate surface area, said increase in said wall thickness of said first arcuate side wall segment thereby providing sufficient sealing depth for said valve seating surface relative to said valve plug.

3. The valve of claim 2 in which said inwardly directed taper of said first side wall segment begins at said hub portion and terminates at said first arcuate transverse junction.

4. Said valve of claim 1 in which said valve plug is formed of tantalum and said valve seat means is formed of Teflon.

5. The valve of claim 1 in which said valve plug and valve seat means are formed of tantalum.

References Cited

UNITED STATES PATENTS 3,420,262   1/1969   O'Neill _____ 137—375

FOREIGN PATENTS 1,182,016   1/1959   France.

HENRY T. KLINKSIEK, Primary Examiner

U.S. Cl. X.R.

251—333, 361

PO-1050
(5/69)

UNITED STATES PATENT OFFICE
CERTIFICATE OF CORRECTION

Patent No. 3,474,820      Dated October 28, 1969

Inventor(s) WILLIAM G. O'NEILL, JR.

It is certified that error appears in the above-identified patent and that said Letters Patent are hereby corrected as shown below:

Col. 4, line 55, for "Y-pattern and" read --Y-pattern valve and--

Col. 6, line 54, for "adjacent flange 61 of the piping network" read --adjacent flange of the piping network--

Col. 9, line 31, for "mounted on said" read --mounted to said--

Col. 9, line 37, for "to and end" read --to an end--

SIGNED AND SEALED
JUN 2 1970

(SEAL)
Attest:

Edward M. Fletcher, Jr.
Attesting Officer

WILLIAM E. SCHUYLER, JR.
Commissioner of Patents